W. SHERROD.
Mandrel.
No. 8,562. Patented Dec. 2, 1851.
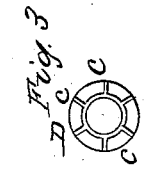
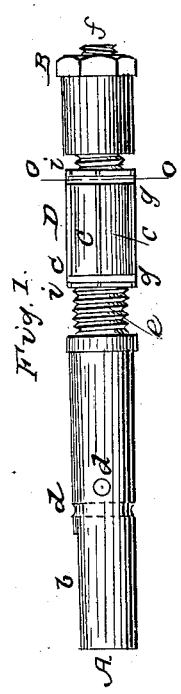
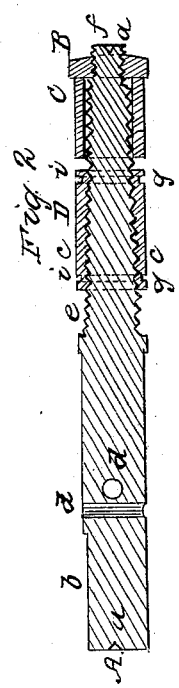
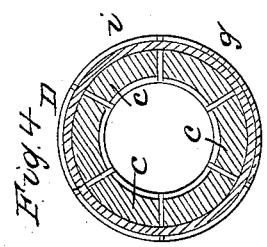

UNITED STATES PATENT OFFICE.

WALTER SHERROD, OF PROVIDENCE, RHODE ISLAND.

EXPANDING MANDREL.

Specification of Letters Patent No. 8,562, dated December 2, 1851.

*To all whom it may concern:*

Be it known that I, WALTER SHERROD, of the city and county of Providence, State of Rhode Island, have invented a new and useful Expanding Mandrel for Lathe-Turning and other Purposes; and I do hereby declare that the following is a full, clear, and exact description of the same, reference being had to the accompanying drawings, forming part of this specification, in which—

Figure 1, is a longitudinal elevation. Fig. 2, is a longitudinal section. Fig. 3, is a detached end view of the shell forming part of the mandrel. Fig. 4 is a transverse section of the shell on an enlarged scale, taken through the line O, O, Fig. 1. Fig. 5 is a detached perspective view of one of the segments or pieces used to form a shell of modified shape.

The same letters of reference denote similar parts in each of the several figures.

The nature of my invention consists in the use of an arbor having a taper screw cut upon it, on which is fitted an expanding shell or nut formed of segments or pieces whose length lie longitudinally with the arbor and which are held together by coiled springs encircling them.

To enable others skilled in the art, to make and use my invention, I will proceed to describe its construction and operation.

A is a turning arbor with female centers $a$, $a$, at either end. It is flattened near one end, so as to form a surface $b$ (one or more of them) to procure a proper grip in the vise when fitting on, or taking off the work, or for applying thereto a wrench, holes $d$, $d$, answering also for the same. The other end of the arbor is made with a taper screw $e$ upon it, which at its extremity has for a short distance (of reduced diameter) a screw $f$ cut with a left handed thread, the screw $e$, being reversely of this.

B is a nut fitting on the screw $f$, and C a loose collar of sufficient bore to slide up the tapering screw $e$.

D is the expanding shell or nut formed of segments $c$ $c$ $c$ which are produced by cutting the nut into strips or pieces lengthwise of its depth—such divisions or cuts being made after the nut has been turned around or otherwise finished on its periphery, the taper hole and screw made through it, and grooves $i$ $i$ turned or cut near either end; the thread upon the interior surface of the segments corresponding with the taper screw $e$, the nut D will always have the same bearing surface, whatever position it occupies as regards the direction in length on the taper screw $e$, the which altered position wheron, will cause the segments to be separated or drawn closer together (according to the direction up or down on the screw $e$) and to be thrown farther or nearer from the center of the arbor as may be.

$g$ $g$ are coiled springs (or one only in the center lengthwise of the nut may be used) fitting in the grooves $i$ $i$. They are made of sufficient length for the one end of each spring to lap some distance over the other end as seen more particularly in Fig. 4, and serve to hold together the segments when not in use or when withdrawn from the work they carry.

From this description of the construction it will be evident that the shell or nut D may be made to fit concentrically various diameters of holes as its position along the screw $e$ is altered, and a firm hold or friction produced on the work, by simply driving up the collar $c$, (of suitable length) through means of the left handed nut B, which answers to lock the shell D so fitted, or any other mode of operating the shell D so as to increase or lessen its diameter, as it were, by varying its position on the taper screw $e$, may be adopted, and the collar C, if desired, altogether dispensed with, and dogs or other such driving arrangement used in addition to the friction of the shell on the work as is usual or desirable; the springs $g$, $g$, by their ends lapping one over the other, admit of the greatest diameter of shell being used that the taper screw $e$ will produce without endangering the separation of the several segments composing the nut D when the work it is used to drive is removed.

The nut or shell D being worked up the taper screw, in a gradual, winding manner, will cause the periphery of it to alight with much greater effect on the work it is intended to carry than if it (the shell) were forced forward on a smooth inclined surface.

The exterior form or shape of the shell D may be of equal diameter for the entire of its length as seen in the drawing, or of any other shape according to the work fitting thereon or effect it is intended to produce, its exterior form greatly varying when applied to drawing soft or hot pipes or other pliable work to which purpose it is applicable; also the arbor may be made in two parts and with a right and left handed screw when used for turning up pipes. The several purposes however to which my improved mandrel is applicable it is unnecessary to mention. Each arbor may have any number of shells of different length and shape to fit it so as to suit work of various descriptions and avoid "scoring" when turning, Fig. 5 representing a slightly modified form of segment composing a shell, and such other alterations or modifications made not effecting the principle set forth as circumstances may suggest, and which it is unnecessary further to mention, the mandrel so constructed being adjustable and saving, as is evident, a large amount of labor.

What I claim as my invention, and desire to secure by Letters Patent, is—

1. The use of an expanding nut or shell, D, formed in segments whose interior faces have portions of a screw thread cut thereon which fit within and correspond with the thread of a taper screw $e$ of the mandrel.

2. The manner of holding together or retaining in their places, the several segments $c\ c\ c$ of the expanding shell or nut by means of a coiled spring, or springs, $g,\ g$, encircling the segments, and made of sufficient length to admit of the nut expanding without destroying the confinement or hold of the segments as described.

WALTER SHERROD

Witnesses:
CHARLES F. TILLINGHAST,
HENRY MARTIN.